United States Patent
Gale et al.

(10) Patent No.: US 9,190,868 B2
(45) Date of Patent: Nov. 17, 2015

(54) VEHICLE AND METHOD FOR CHARGING VEHICLE BATTERIES

(75) Inventors: Allan Roy Gale, Livonia, MI (US); Paul Theodore Momcilovich, Tecumseh, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1067 days.

(21) Appl. No.: 13/102,528

(22) Filed: May 6, 2011

(65) Prior Publication Data

US 2012/0280646 A1  Nov. 8, 2012

(51) Int. Cl.
*H02J 7/00* (2006.01)
*H02J 7/04* (2006.01)
*B60L 11/18* (2006.01)

(52) U.S. Cl.
CPC .............. *H02J 7/04* (2013.01); *B60L 11/1838* (2013.01); *B60L 11/1868* (2013.01); *H02J 7/0013* (2013.01); *Y02T 10/7005* (2013.01); *Y02T 10/7055* (2013.01); *Y02T 10/7066* (2013.01); *Y02T 90/121* (2013.01); *Y02T 90/128* (2013.01); *Y02T 90/14* (2013.01); *Y02T 90/163* (2013.01)

(58) Field of Classification Search
USPC ........................................................ 320/104
See application file for complete search history.

(56) References Cited

U.S. PATENT DOCUMENTS

| 5,625,275 | A | 4/1997 | Tanikawa et al. | |
|---|---|---|---|---|
| 5,939,862 | A | 8/1999 | Kates et al. | |
| 6,222,347 | B1 | 4/2001 | Gong | |
| 6,314,346 | B1 * | 11/2001 | Kitajima et al. | 701/22 |
| 6,392,380 | B2 * | 5/2002 | Furukawa et al. | 320/104 |
| 6,747,438 | B2 * | 6/2004 | Emori et al. | 320/126 |
| 6,777,913 | B2 * | 8/2004 | You | 320/125 |
| 6,794,847 | B2 * | 9/2004 | Hosoda et al. | 320/104 |
| 6,979,977 | B2 * | 12/2005 | Amano et al. | 320/104 |
| 7,570,012 | B2 * | 8/2009 | Dasgupta et al. | 320/104 |
| 2003/0173932 | A1 * | 9/2003 | Toya et al. | 320/104 |
| 2008/0036419 | A1 * | 2/2008 | Cook et al. | 320/104 |
| 2008/0067973 | A1 * | 3/2008 | Ishikawa et al. | 320/104 |
| 2010/0097031 | A1 * | 4/2010 | King et al. | 320/109 |
| 2011/0163715 | A1 * | 7/2011 | Gale et al. | 320/109 |
| 2011/0221392 | A1 * | 9/2011 | Gale et al. | 320/109 |

* cited by examiner

*Primary Examiner* — Drew A Dunn
*Assistant Examiner* — Steve T Chung
(74) *Attorney, Agent, or Firm* — David B. Kelley; Brooks Kushman P.C.

(57) ABSTRACT

An automotive vehicle includes a traction battery, an auxiliary battery and at least one controller. The at least one controller may be configured to cause a specified charge current to be provided to the traction battery and to cause another specified charge current to be provided to the auxiliary battery if the current being provided to the traction battery is increasing or decreasing.

11 Claims, 4 Drawing Sheets

VEHICLE AND METHOD FOR CHARGING VEHICLE BATTERIES

BACKGROUND

Plug-in hybrid electric vehicles and battery electric vehicles typically include a battery charger that may receive electrical energy from an electrical grid via an outlet and provide electrical energy to a traction battery and/or other electrical loads.

SUMMARY

A power system for a vehicle may include a traction battery, an auxiliary battery and a battery charger having a current limit. The battery charger may be configured to provide a specified charge current to the fraction battery and to provide another specified charge current to the auxiliary battery having a magnitude approximately equal to a difference between the current limit and a magnitude of the specified charge current.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
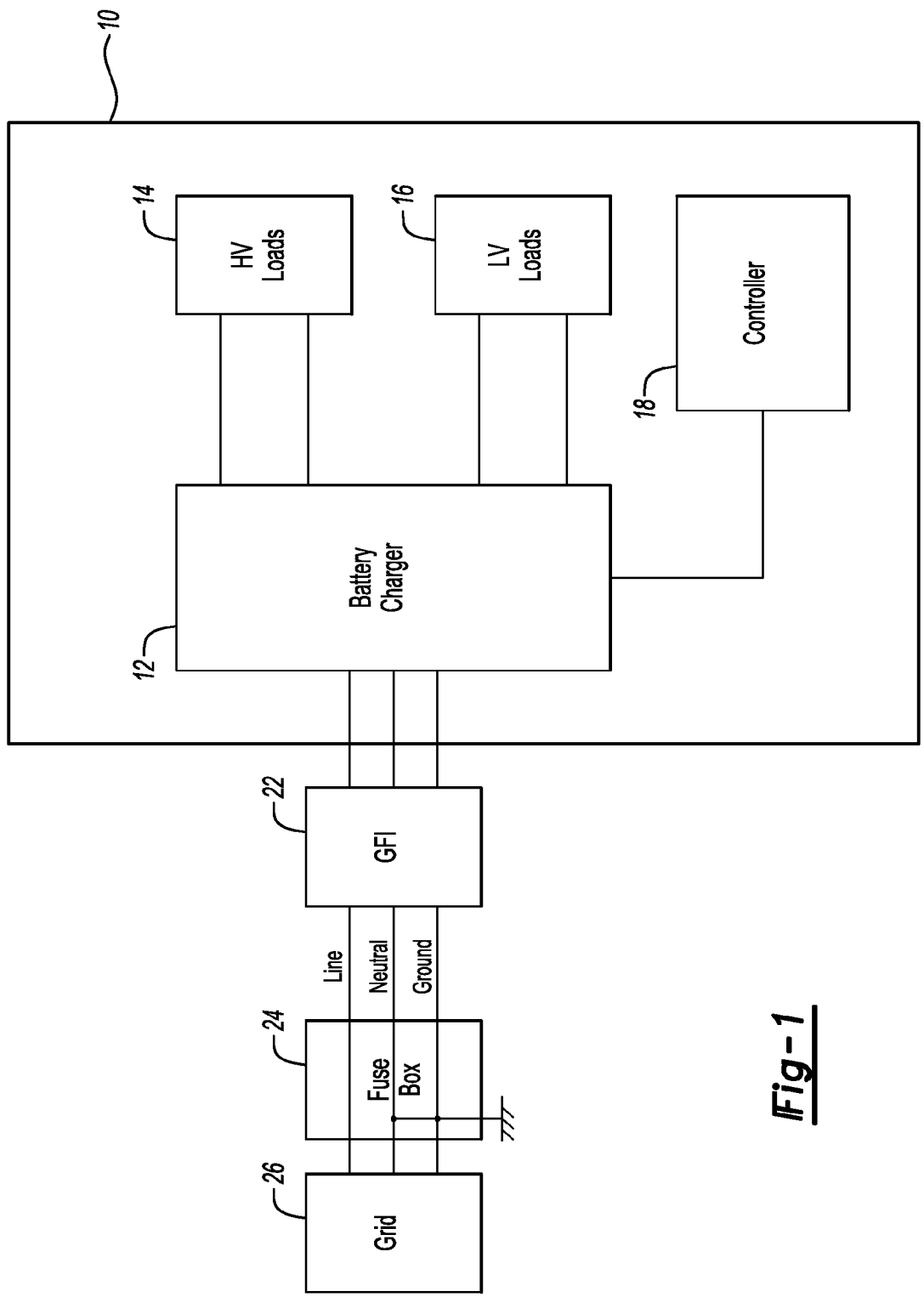
FIG. 1 is a block diagram of an automotive vehicle electrically connected with an electrical grid.

Referring to FIG. 1, a vehicle 10 (e.g., battery electric vehicle, plug-in hybrid electric vehicle, etc.) includes a battery charger 12, high-voltage loads 14 (e.g., a traction battery, electric machine, etc.) and low-voltage loads 16 (e.g., a +12V (low-voltage) battery, logic circuitry, etc.) The battery charger 12 is electrically connected with the high-voltage loads 14 and low-voltage loads 16. The vehicle 10 also includes a controller 18. The battery charger 12 is in communication with/under the control of the controller 18. Other arrangements including a different number of loads, chargers (location of chargers (e.g., off-board)), controllers, etc. are also possible.

The battery charger 12 is configured to receive electrical power from an electrical grid 26 (or other electrical power source). The vehicle 10, for example, may be plugged into an outlet (e.g., a wall outlet) such that the battery charger 12 is electrically connected with the electrical grid 26 via a ground fault interrupter (GFI) 22 (or similar device) and fuse box 24. Line and neutral wires (the AC line) and a ground wire are shown, in this example, electrically connecting the battery charger 12 and grid 26. The ground wire is electrically connected with the neutral wire and earth ground at the fuse box 24. Other electrical configurations, such as a 240 V arrangement with L1, L2 and ground wires, are also contemplated.

The battery charger 12 may determine (e.g., measure) the voltage and current on the AC line as well as the voltage and current output to the loads 14, 16. The battery charger 12, in the embodiment of FIG. 1, may control the high-voltage output current (the current output to the high-voltage loads 14) and the low-voltage output voltage set point (the set point of the voltage output to the low-voltage loads 16). The battery charger 12 may also control any combination of the high-voltage and/or low-voltage output currents and/or voltage set points.

The above mentioned low-voltage control may allow the low-voltage system to supply smooth regulated output low-voltage for control electronics by supplying all required current to maintain the set point voltage up to the limit of the converter design. While the high-voltage output of the battery charger 12, in the embodiment of FIG. 1, has both a smooth voltage and current (power output can thus easily be maintained), the low-voltage power output can fluctuate depending on loads turning on and off in the vehicle 10.

Figure 2:
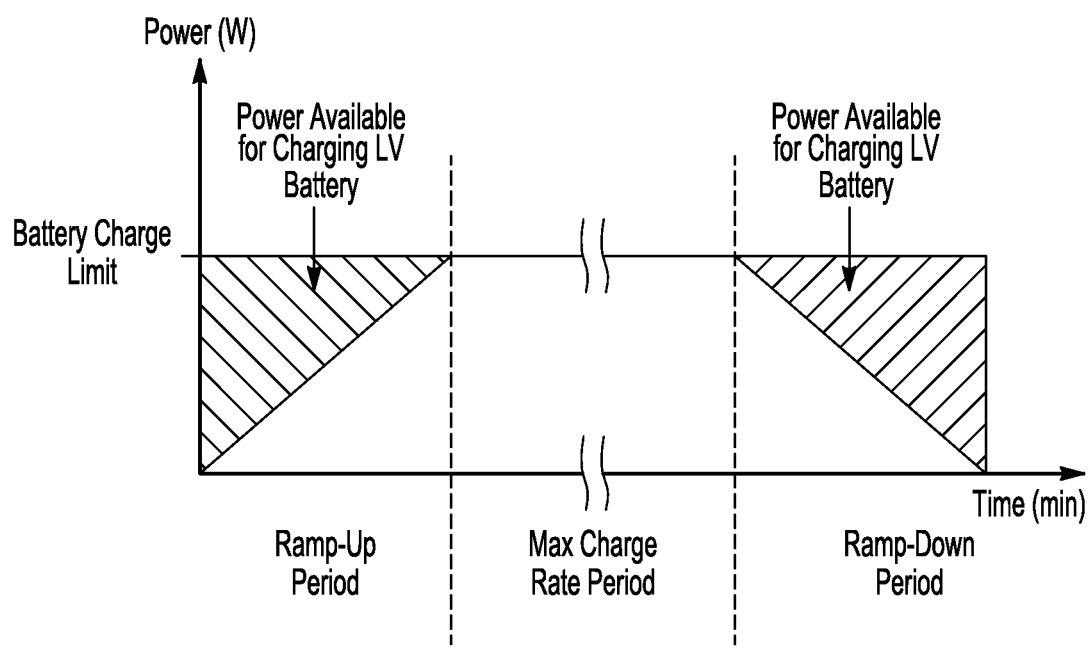
FIG. 2 is a plot of power versus time.

Referring to FIGS. 1 and 2, a typical charge profile (at a given battery temperature, age and state-of charge, etc.) for charge power supplied by the battery charger 12 to the traction battery 14 includes a ramp-up period, a max charge rate period, and a ramp-down period. The ramp-up and ramp-down periods have a duration that may be determined before charging and that depends on factors such as battery temperature, battery age, state of charge, charger characteristics, etc. That is, the amount of time needed to ramp the high-voltage charge current from zero to the target may be predetermined. Likewise, the amount of time needed to ramp the high-voltage charge current from the target to zero may be predetermined. The duration of the max charge rate period, however, depends on the initial state of charge of the traction battery 14 as well as other factors that may impact the duration of the max charge rate period.

The maximum current that can be supplied by the battery charger 12 to the high-voltage and low-voltage loads 14, 16 during charging is determined by the battery charger 12. The battery charger 12 thus has a limit as to how much current it can supply to the high-voltage and low-voltage loads 14, 16. In the example of FIG. 2, the current supplied to the traction battery 14 during the maximum charge period is equal to this limit. The traction battery 14, in certain circumstances however, may be unable to accept the maximum current that can be supplied by the battery charger 12 because of battery temperature, etc. In these circumstances, the current supplied to the traction battery 14 during the maximum charge period may be equal to the limit determined by the traction battery 14.

As explained above, the battery charger 12 may control the voltage set point of power supplied to the low-voltage loads 16. During charging of the low-voltage battery 16, current may flow in an uncontrolled manner (up to the limit of the battery charger 12) to the low-voltage battery 16 to meet the voltage set point specified by the battery charger 12. The low-voltage battery 16 may thus consume all available current for charging in circumstances in which the initial state of charge of the low-voltage battery 16 is relatively low (e.g., a fully discharged battery). This may preclude, during certain periods of time, the simultaneous charging of the fraction battery 14 and low-voltage battery 16, and extend the time needed to charge the batteries 14, 16.

The durations of time for the ramp-up and ramp-down charge periods may be predetermined according to traction battery type, cell charge characteristics, etc. as mentioned above. The fraction battery charge profile and the threshold current limit of the battery charger 12 (and traction battery 14)

may also be known (predetermined) according to traction battery type, etc. The amount of energy available for charging the low-voltage battery 16 during the ramp-up and ramp-down periods of traction battery charging may thus be determined assuming that the low-voltage battery 16 will be charged with a current whose magnitude is approximately equal to the difference between the threshold current limit of the battery charger 12 and that defined by the traction battery charge profile. Hence, the battery charger 12 may not permit uncontrolled current flow (up to the threshold limit of the battery charger 12) to the low-voltage battery 16 to satisfy the low-voltage set point. Rather, the battery charger 12 may control the current flow to the low-voltage battery 16 during the ramp-up and ramp-down portions of traction battery charging. (The battery charger 12 may also control the current flow to the low-voltage battery 16 during the maximum charge period if the current limit of the traction battery 14 is less than the current limit of the battery charger 12 according to the difference between the current limits.)

As an example, if the threshold current limit of the battery charger 12 is equal to 11 amps and, at a particular time, the magnitude of current associated with the ramp-up portion of the traction battery charge profile is equal to 4 amps, then the current available to charge the low-voltage battery 16 at that time is equal to 7 amps. The current available for charging the low-voltage battery 16 may similarly be determined for all time instants during the ramp-up and ramp-down periods of traction battery charging. The energy available for charging the low-voltage battery 16 at each such time instant may be calculated based upon the associated current, voltage, and time increment as known in the art. These energies may then be summed to determine the total energy available for charging the low-voltage battery 16 during charging of the traction battery 14.

If the amount of energy available for charging the low-voltage battery 16 during the ramp-up and ramp-down periods of traction battery charging is greater than the amount of energy needed to charge the low-voltage battery 16 to its target, then the battery charger 12 may charge the low-voltage battery 16 at currents whose magnitudes are defined as above during the ramp-up and ramp-down periods of charging the high-voltage battery 14. The low-voltage battery 16 will necessarily be charged to its target by the time the battery charger 12 reaches the end of the ramp-down period of traction battery charging. If the amount of energy available for charging the low-voltage battery 16 during the ramp-up and ramp-down periods of fraction battery charging is less than the amount of energy needed to charge the low-voltage battery 16 to its target, then the battery charger 12 may charge the low-voltage battery 16 during the ramp-up and ramp-down periods by controlling the current flow to the low-voltage battery 16 (as opposed to controlling the voltage set point), and also charge the low-voltage battery 16 by controlling the voltage set point output to the low-voltage battery 16—thus permitting the uncontrolled flow of current (up to the threshold limit of the battery charger 12) to the low-voltage battery 16 before or after charging the traction battery 16.

Alternatively, if the amount of energy available for charging the low-voltage battery 16 during the ramp-up and ramp-down periods of traction battery charging is less than the amount of energy needed to charge the low-voltage battery 16 to its target, the battery charger 12 may simply permit the uncontrolled flow of current (up to the threshold limit of the battery charger 12) to the low-voltage battery 16 while attempting to also charge the traction battery 14. Other scenarios are also possible.

The amount of energy needed to charge the low-voltage battery 16 to its target may be determined based on a measured voltage (state of charge) associated with the low-voltage battery 16. For example, a look-up table may store a mapping of initial voltage and energy needed to charge the low-voltage battery 16 to its target. Information to populate such a look-up table may be generated in any known/suitable fashion via testing, simulation, etc.

Figure 3A:
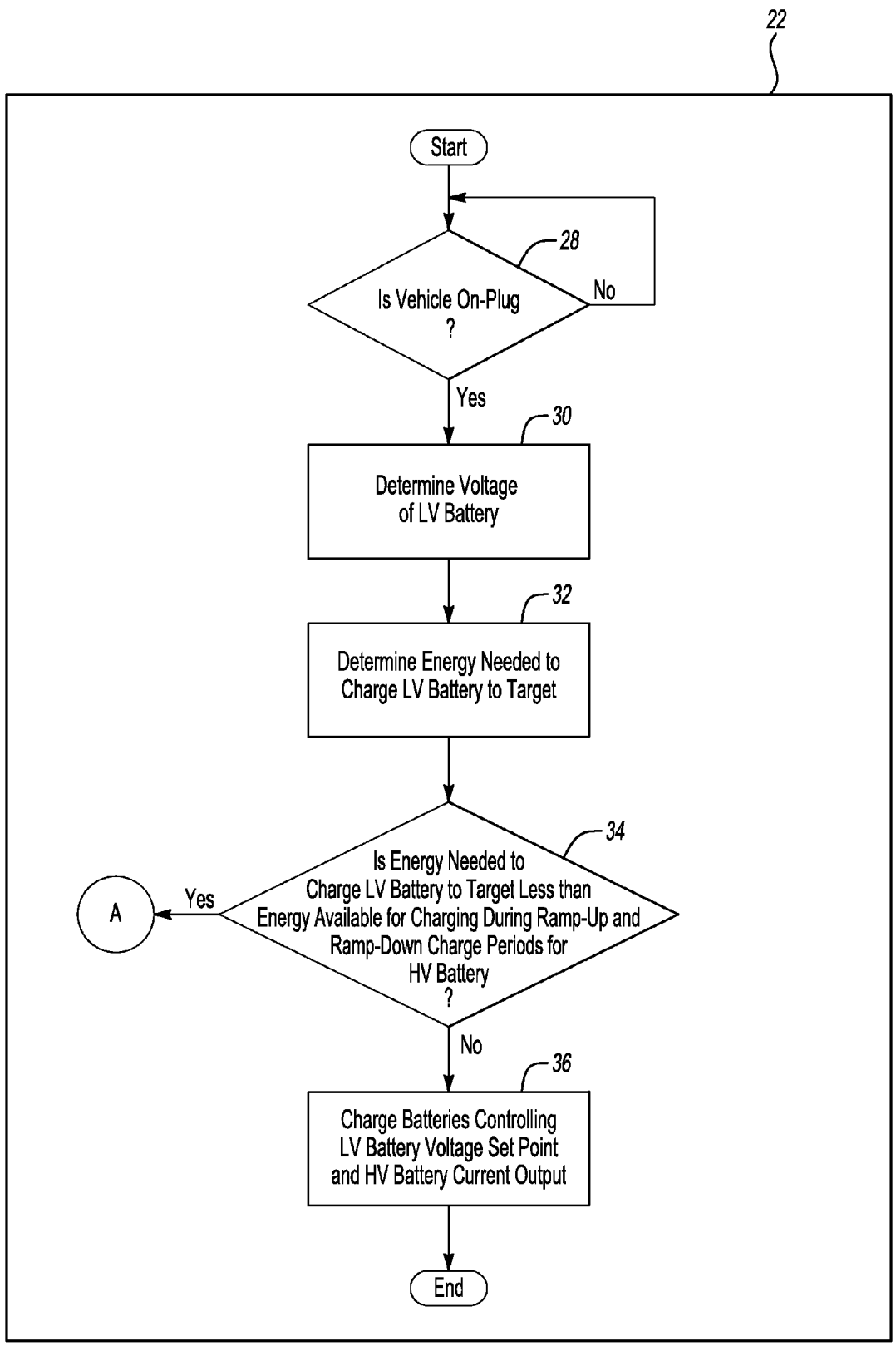
FIGS. 3A and 3B are flow charts depicting an algorithm for controlling power flow through the battery charger of FIG. 1.
Figure 3B:
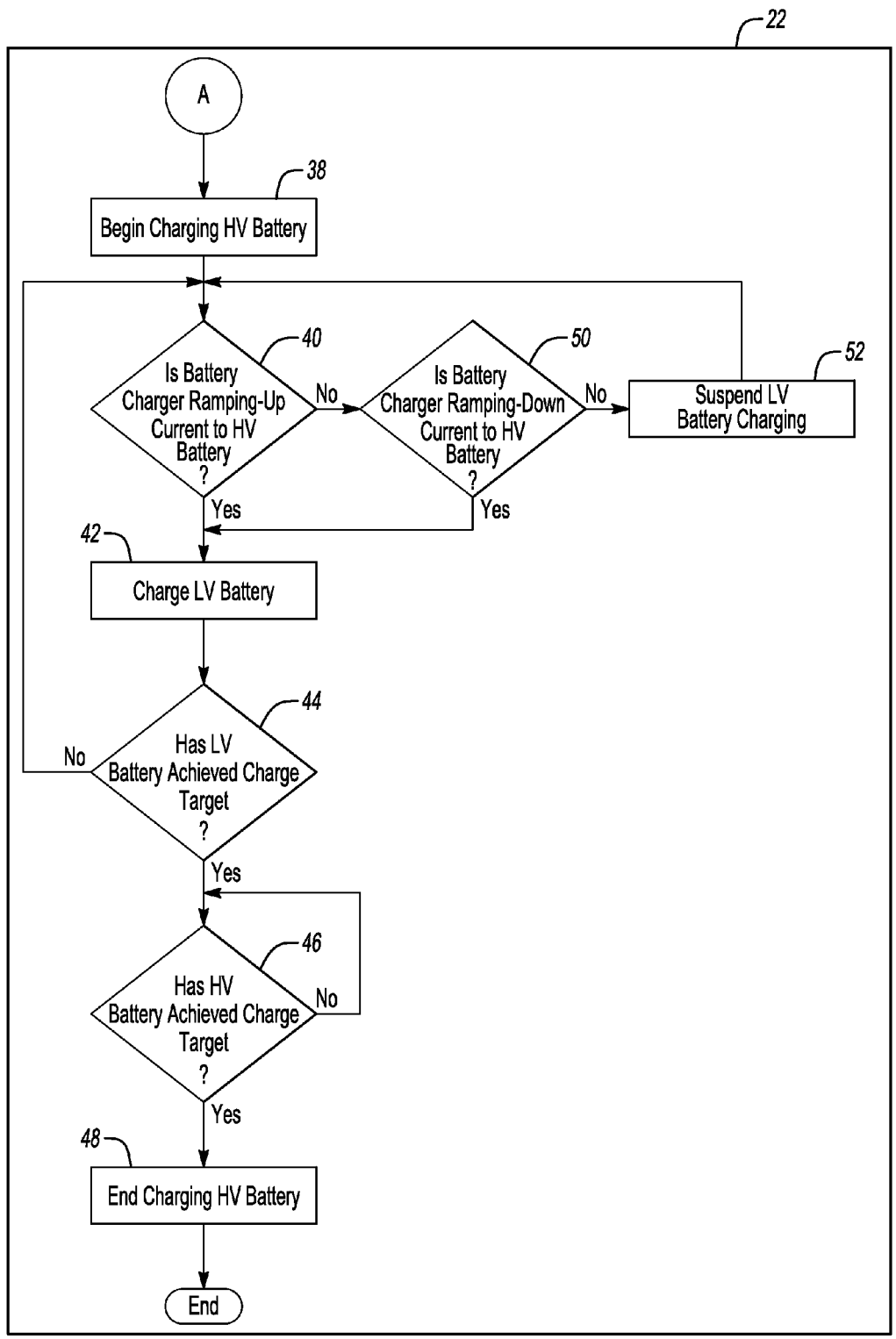

Referring to FIGS. 1 and 3A, it is determined whether the vehicle is on-plug at operation 28. The controller 18, for example, may determine whether the battery charger 12 is electrically connected with the electrical grid 26 in any known/suitable fashion. If no, the algorithm returns to operation 28. If yes, the voltage of the low-voltage battery is determined at operation 30. The controller 18, for example, may cause the voltage associated with the low-voltage battery 16 to be measured. At operation 32, the energy needed to charge the low-voltage battery is determined. For example, the controller 18 may inspect a look-up table storing voltage and corresponding energy values as described above. That is, based on the initial voltage of the low-voltage battery 16, the amount of energy needed to charge the low-voltage battery 16 to its target may be read from the look-up table. Other suitable/known techniques, however, may also be used. At operation 34, it is determined whether the energy needed to charge the low voltage battery to its target is less than the energy available for charging during the ramp-up and ramp-down charge periods for the traction battery. For example, the controller 18 may compare the energy value determined at operation 32 with a stored energy value representing the energy available for charging during the ramp-up and ramp-down charge periods for the traction battery. If no, the batteries may be charged controlling the set point of the output voltage to the low-voltage battery and the current output to the traction battery. The controller 18, for example, may attempt to charge the batteries 14, 16 at the same time. Charging of the low-voltage battery 16, however, may preempt charging of the traction battery 14 during certain intervals as the battery charger 12 may permit current to flow in an uncontrolled fashion (up to the limit of the battery charger 12) to the low-voltage battery 16 to satisfy the low voltage output set point. The algorithm then ends.

If yes, charging of the fraction battery begins at operation 38. The battery controller 18, for example, may enable the battery charger 12 to begin providing charge current to the traction battery 14 according to the charge profile illustrated in FIG. 2. At operation 40, it is determined whether the battery charger is ramping-up current to the traction battery. The controller 18 may determine, for example, if the current being supplied to the traction battery 14 is increasing. If yes, the low-voltage battery 16 is charged at operation 42. For example, the battery charger 18 may cause the low-voltage battery 16 to be charged with a power whose magnitude is approximately equal to the difference between the power threshold of the battery charger 12 and the power being supplied to the traction battery 14. For those familiar with the art, the power available to the batteries 14, 16 may be determined from the charger input available power and the known charger efficiency.

At operation 44, it is determined whether the low-voltage battery 16 has achieved its charge target. The battery charger 18, for example, may compare the actual state of charge of the low-voltage battery 16 with the target. If no, the algorithm returns to operation 40. If yes, it is determined whether the traction battery has achieved its charge target at operation 46. The battery charger 18, for example, may compare the actual state of charge of the traction battery 14 with the target. If no, the algorithm returns to operation 46. If yes, charging of the fraction battery is discontinued at operation 48. For example, the controller 18 may cause the battery charger 12 to stop providing charge current to the traction battery 14.

Returning to operation 40, if no, it is determined whether the battery charger is ramping-down current to the traction battery at operation 50. The controller 18, for example, may determine whether current being supplied to the fraction battery 14 is decreasing. If yes, the algorithm proceeds to operation 42. If no, charging of the low-voltage battery may be suspended at operation 52. For example, the controller 18 may cause the battery charger 12 to stop providing charge current to the low-voltage battery 16. The algorithm then returns to operation 40.

The algorithms disclosed herein may be deliverable to/implemented by a processing device, such as the battery charger 12 or controller 18, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. An automotive vehicle comprising:
    a traction battery;
    an auxiliary battery having an energy storage capacity less than the traction battery; and
    at least one controller configured to, in response to available energy for auxiliary battery charging during non-maximum traction battery charge periods being less than an amount of energy needed to charge the auxiliary battery to a target voltage, cause a specified charge current to be provided to the auxiliary battery during the non-maximum charge periods such that traction battery charging is completed before auxiliary battery charging is completed.

2. The vehicle of claim 1 wherein the at least one controller is further configured to cause current flow to the auxiliary battery to be suspended if current being provided to the traction battery is generally constant.

3. The vehicle of claim 1 wherein the at least one controller is further configured to determine a voltage of the auxiliary battery and to cause the specified charge current to stop being provided to the auxiliary battery if the voltage is equal to the target voltage.

4. The vehicle of claim 1 wherein the at least one controller is further configured to determine an initial voltage of the auxiliary battery and wherein the amount of energy needed to charge the auxiliary battery depends on the initial voltage.

5. A method comprising:
    in response to available energy for +12V battery charging being less than an amount of energy needed to charge a +12V battery to a target voltage, providing current to the +12V battery, during non-maximum charge periods, having a magnitude equal to a difference between a current limit and magnitude of charge current provided to a traction battery during the non-maximum charge periods to complete traction battery charging before +12V battery charging.

6. The method of claim 5 further comprising suspending current flow to the +12V battery if current being provided to the traction battery is generally constant.

7. The method of claim 5 further comprising determining a voltage of the +12V battery and discontinuing current flow to the +12V battery if the voltage is equal to the target voltage.

8. The method of claim 5 further comprising determining an initial voltage of the +12V battery and wherein the amount of energy needed to charge the +12V battery depends on the initial voltage.

9. A power system for a vehicle comprising:
    a traction battery;
    an auxiliary battery having an energy storage capacity less than the traction battery; and
    a battery charger having a current limit and configured to, in response to available energy for auxiliary battery charging during non-maximum traction battery charge periods being less than an amount of energy needed to charge the auxiliary battery to a target voltage, provide a specified charge current to the auxiliary battery having a magnitude equal to a difference between the current limit and a magnitude of current provided to the traction battery during the non-maximum charge periods such that traction battery charging is completed before auxiliary battery charging is completed.

10. The system of claim 9 wherein the battery charger is further configured stop current flow to the auxiliary battery if a voltage of the auxiliary battery is equal to the target voltage.

11. The system of claim 9 wherein the amount of energy needed to charge the auxiliary battery depends on an initial voltage of the auxiliary battery.

* * * * *